United States Patent [19]

Nakazawa et al.

[11] 4,175,939
[45] Nov. 27, 1979

[54] METHOD AND APPARATUS FOR INTRODUCTION OF GLASS FILAMENT STRAND ONTO FEED ROLLER OF CHOPPED GLASS FILAMENT STRANDS MANUFACTURING SYSTEM

[75] Inventors: Koji Nakazawa; Toshiaki Kikuchi; Toshihito Fujita, all of Fukushima, Japan

[73] Assignee: Nitto Boseki Co., Ltd., Fukushima, Japan

[21] Appl. No.: 920,836

[22] Filed: Jun. 30, 1978

[30] Foreign Application Priority Data

Jul. 11, 1977 [JP] Japan .................................. 52-82855

[51] Int. Cl.² ............................................ C03B 37/02
[52] U.S. Cl. ............................................ 65/2; 65/3 R; 65/11 R; 83/913; 226/92
[58] Field of Search ...................... 226/92, 91; 83/913; 65/2, 11 R, 3 R

[56] References Cited

U.S. PATENT DOCUMENTS

| | | | |
|---|---|---|---|
| 3,815,461 | 6/1974 | Genson | 83/913 X |
| 3,869,268 | 3/1975 | Briar et al. | 65/11 R X |

FOREIGN PATENT DOCUMENTS

| | | | |
|---|---|---|---|
| 50-27089 | 9/1975 | Japan | 65/11 R |
| 50-27090 | 9/1975 | Japan | 65/11 R |

Primary Examiner—Robert L. Lindsay, Jr.
Attorney, Agent, or Firm—Norbert P. Holler

[57] ABSTRACT

A system for manufacturing chopped strands of glass filaments wherein a multiplicity of glass filaments are extruded through orifices in the bottom of at least two spinning furnaces and a sizing agent is applied and the filaments are collected to form at least two strands. The strands brought into contact with the circumferential surface of a feed roller through a predetermined angle so as to be drawn and attenuated by frictional force exerted by the circumferential surface of the feed roller while the strands are cut into chopped strands of a predetermined length with a cutter roller in contact with the feed roller. An auxiliary feed roller is disposed adjacent to one end portion of and in axial alignment with the main feed roller and is driven independently thereof. An auxiliary cutter roller is adapted to contact under pressure the circumferential surface of the auxiliary feed roller to rotate therewith. When introducing a strand onto the main feed roller, the auxiliary feed roller is maintained substantially stationary or driven at a relatively low speed while the main feed roller is rotated at a normal attenuation speed, and the strand is wound on and taken up by the auxiliary feed roller. The speed of the auxiliary feed roller is gradually increased to a normal attentuation speed, and thereafter the strand on the auxiliary feed roller is moved onto the main feed roller.

4 Claims, 3 Drawing Figures

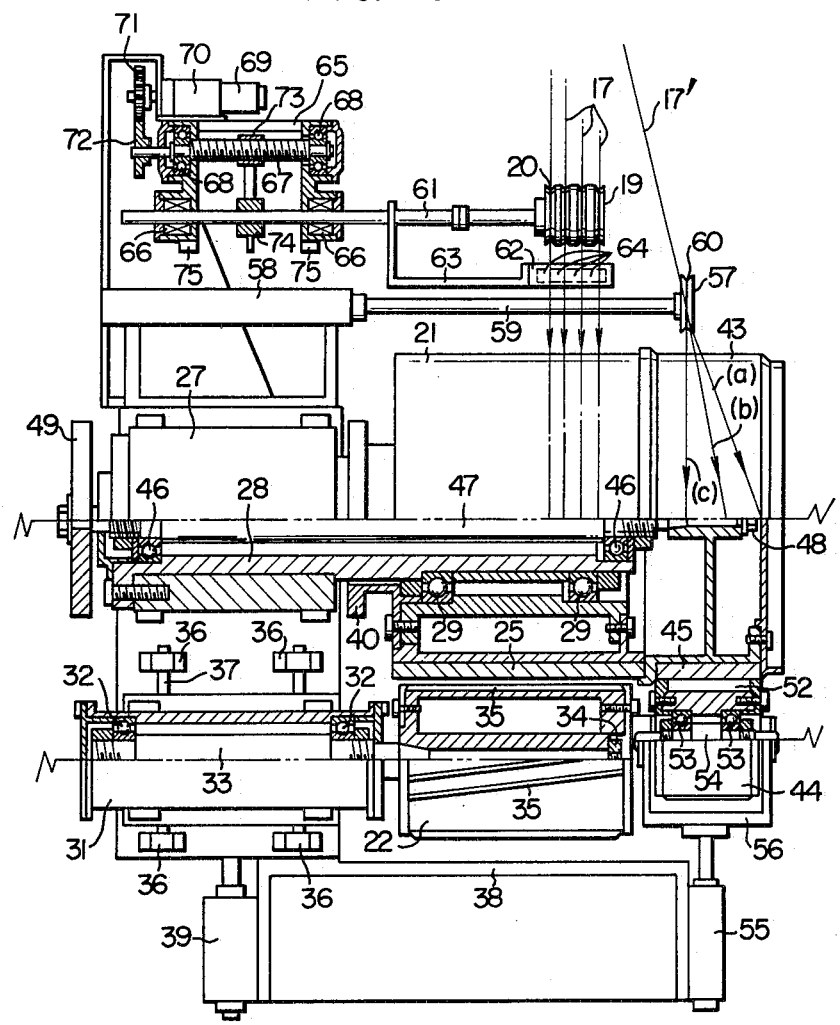

METHOD AND APPARATUS FOR INTRODUCTION OF GLASS FILAMENT STRAND ONTO FEED ROLLER OF CHOPPED GLASS FILAMENT STRANDS MANUFACTURING SYSTEM

BACKGROUND OF THE INVENTION

The present invention relates to a system for manufacturing chopped strands of glass filaments, and more particularly to a method and an apparatus for introducing a strand of glass filaments onto a feed roller of the system.

Japanese Patent Publication No. 50-27089 discloses a method of manufacturing chopped strands of glass filaments directly from strands of glass filaments which are formed such that a multiplicity of glass filaments extruded through orifices at the bottom of a spinning furnace and applied with a sizing agent are corrected to form the strand. More particularly, the strand of glass filaments is taken up by a single feed roller to contact the circumferential surface thereof through a predetermined angle so that glass filaments of the strand are drawn and attenuated by frictional force due to the contact with the surface of the feed roller. A cutter roller is disposed to contact under pressure the circumferential surface of the feed roller, thereby cutting the strand into chopped strands of a predetermined length. The position of the feed roller where the cutter roller contact the circumferential surface of the feed roller is selected so that the frictional force imparted to the strand is greater than a drawing force by which normal attenuation of glass filaments of the strand is attained.

In order to increase the productivity of the manufacture method, there has been proposed that a plurality of spinning furnaces are disposed in juxtaposed relationship with each other and a plurality of strands formed of glass filaments extruded from the respective spinning furnaces are taken up by a single feed roller in parallel with each other and cut into chopped strands. However, such a "multi-furnace and multi-strand" system has been unsatisfactory in operation in many respects. For instance, when one of the strands is broken, the introduction of the broken strand onto the feed roller not only is very cumbersome but also produces some serious problems.

In general, in the operation of the above mentioned system, the strands are formed of glass filaments extruded approximately at a rate of 30 to 50 meters per minute from the perspective spinning furnaces. The strands are taken up for attenuation by the feed roller which rotates at high circumferential speed, approximately 1500 to 3000 meters per minute. Therefore, it is very dangerous to introduce the broken strand onto the feed roller while the system continues operation. As a consequence, upon introducing the borken strand onto the feed roller, the feed roller must be slowed down or completely stopped for ensuring safty situation to operators. In other words, the introduction of the broken strand must be made at the sacrifice of the productivity of the system. Furthermore, since glass is a thermo-softening material, streams of molten glass extruded through orifices in the bottom of the spinning furnace must be always drawn under a proper tension to allow the attenuation into filaments. If the drawing force is removed, the molten glass streams would conglomerate into a relatively large bead or beads on the undersurface of the spinning furnace. It is extremely cubersome to remove such a glass bead. Therefore, more than two operators are required for ensuring proper extrusion of glass filaments from all of the spinning furnaces, which is one of the factors which hinder the optimization of the operation of the system.

Furthermore, in the beginning of the operation of the conventional system, the strands consisting of glass filaments in non-attenuation are first brought into engagement with the circumferential surface of an end portion of the feed roller, and thereafter the speed of the feed roller is gradually increased to a normal attenuation speed. After having been completely attenuated, the strands are moved to a cutting portion of the feed roller and the cutting operation is started. However, during the cutting operation, the non-attenuated filaments taken up at the end portion of the feed roller tend to loosen gradually so that pieces like fluffs may fly out and drop and are mixed with the normal chopped strands, which leads to lowering the quality of a product. Additionally, the non-attenuated filaments are relatively thick and have high rigidity so that it is difficult to have them completely engage or wound on the circumferential surface of the feed roller. Therefore, a portion of the strand length tends to move away from and wave about the feed roller with relatively large radii. This is very dangerous to the operators. One method of avoiding the problem is to rapidly increase the speed of the feed roller to a normal attenuation speed after the strands have been taken up by the feed roller so that the length portion of the strand arrested by the roller may be shortened as much as possible. In this case, however, since the strand is rapidly subjected to tension, they are likely to be broken again. Also, rapid wear of the feed roller may occur. An alternate method is to directly introduce the non-attenuated filament strand onto the cutting portion of the feed roller while the speed of the feed roller is gradually increased to a normal attenuation speed. In this method, only chopped strands of glass filaments in normal attenuation are selected and carried out as a commercial product. With this case, however, since the non-attenuated filaments are relatively thick and have high rigidity as above mentioned, the cutter roller must be pressed against the feed roller under a considerably high pressure. As a result, the cutter blades are likely to be filled with chopped strands therebetween so that effective cutting operation is affected adversely. Also, rapid wear of both the feed and cutter rollers would occur. Furthermore, since the thick and rigid non-attenuated filaments are wound on the circumferential surface of the feed roller covered with an elastic material, the surface tends to be formed with corresponding grooves which result in incomplete cutting of the strand. Additionally, when unskilled persons attend to such operation, they tend to erroneously introduce onto the feed roller the strand of glass filaments which has not been cooled sufficiently. As a result, the feed roller is burnt and the cutter blades are broken. Particularly, when the cutter blades are broken, the pieces will fly out at high velocity, injuring nearby operators.

SUMMARY OF THE INVENTION

One of the objects of the present invention is, therefore, to provide a novel method and apparatus for introducing a glass filament strand onto a feed roller which can substantially eliminate the above and other problems encountered in a system of the type in which a plurality of glass filament strands are drawn and attenuated by a single feed roller and chopped off by a single cutter roller.

According to the present invention, in the method of the manufacturing chopped strands of glass filaments as described in Japanese Patent Publication No. 50-27089, there is provided a method of and an apparatus for introducing a strand of glass filaments onto a feed roller in which an auxiliary feed roller is disposed adjacent one end of the main feed roller in axial alignment therewith and is driven independently of the main feed roller and an auxiliary cutter roller is arranged to cooperate with the auxiliary feed roller so as to cut or chop off the strand taken up by the auxiliary feed roller. When one of the strands is accidentally broken during operation of the system, the cutting operation for the remaining unbroken strands may be continued without reduction of a high rotation speed of the main feed roller, while the auxiliary feed roller is maintained substantially stationary or is operated to rotate at a low speed of 30 to 50 meters per minute. The end portion of the broken strand is then wound on the auxiliary feed roller and thereafter the speed of the auxiliary feed roller is gradually increased to a normal attenuation speed of 1,500 to 3,000 meters per minute at which the main feed roller is rotated. After complete attenuation of the broken strand is attained, the strand is transferred from the auxiliary feed roller to the main feed roller. Since the strand taken up by the auxiliary feed roller is continuously chopped off by the auxiliary cutting roller, the wave of the strand about the feed roller as above mentioned is avoided as well as the coming loose and flying out in the form of fluffs. Furthermore, since the main feed roller is not needed to be slowed down during the introduction of the broken strand, the productivity of the system will not be reduced. Also, since the introducing operation may be conducted with safe and ease, the system may be attended by one operator who is not so skilled.

The above and other objects, features and advantages of the present invention will become more apparent from the following description of preferred embodiments taken in conjunction with the accompanying drawings.

BRIEF DESCRIPTION OF THE DRAWINGS

FIG. 3 is an enlarged top view of the main part of the system shown in FIG. 1, the main and auxiliary guide rollers being shown as moved to the same plane in which the main feed roller is disposed.

DESCRIPTION OF THE PREFERRED EMBODIMENTS

Figure 1:
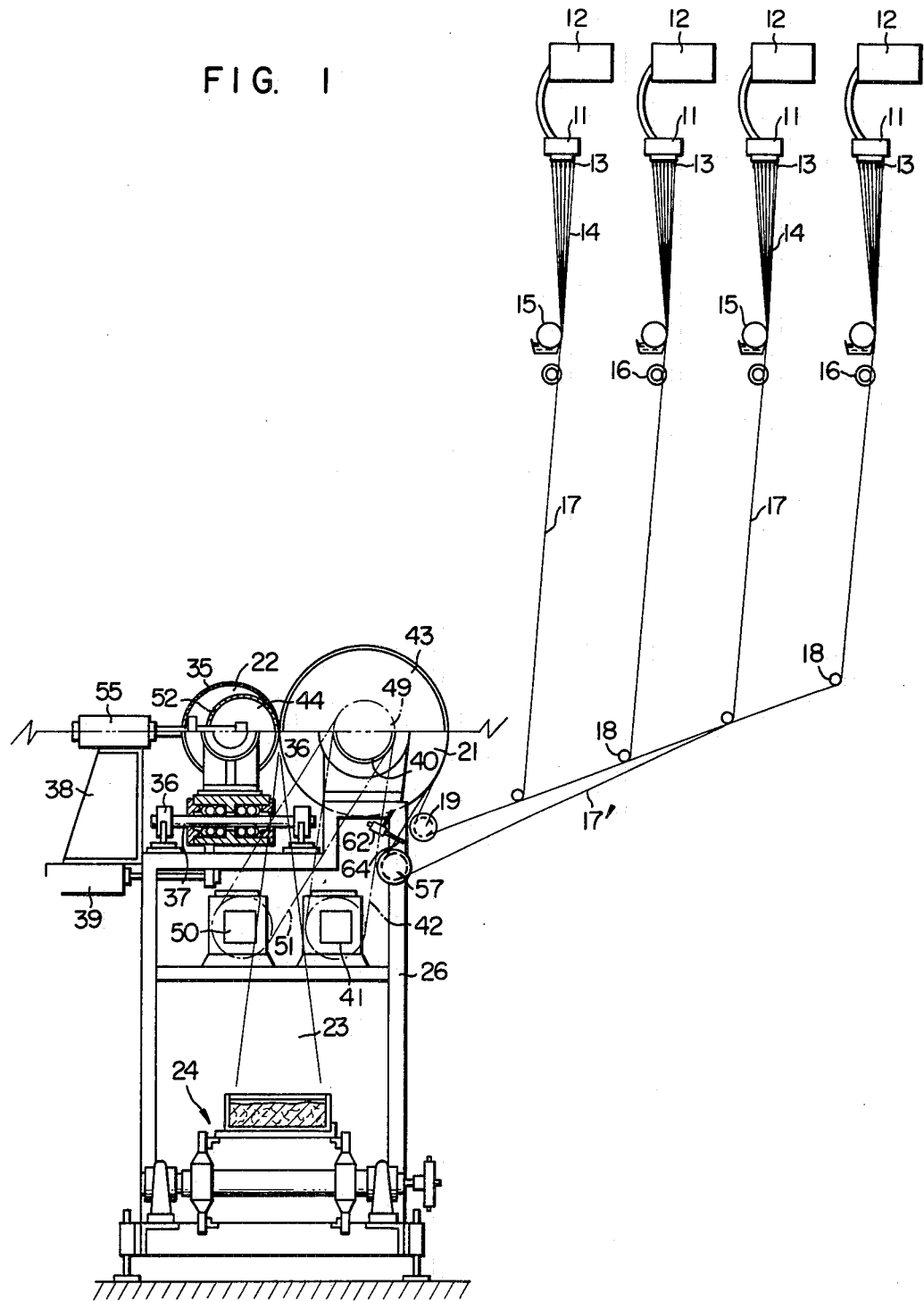
FIG. 1 is a front view partly in section of a preferred embodiment of the system for manufacturing chopped strands of glass filaments in accordance with the present invention.
Figure 2:
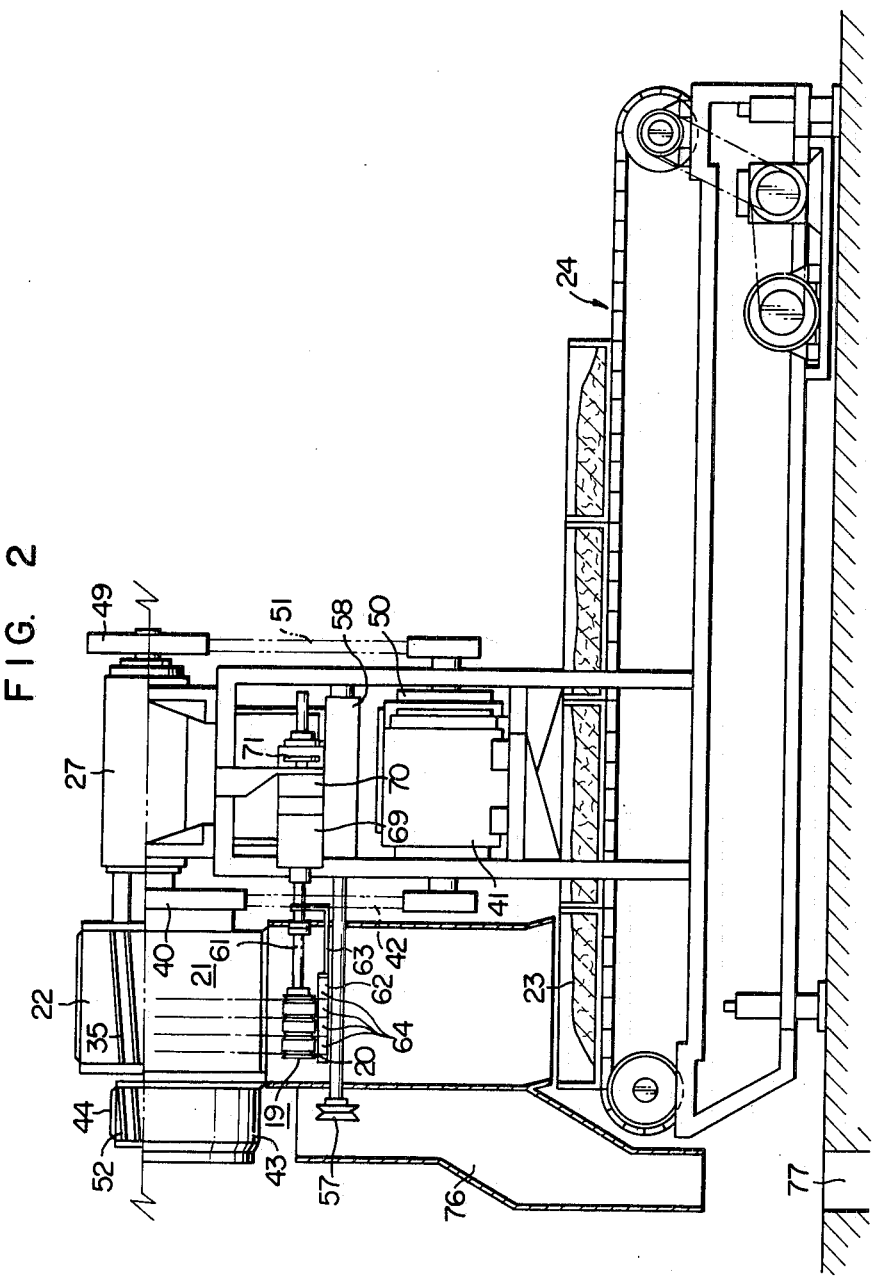
FIG. 2 is a side view of the main part of the system shown in FIG. 1, the upper halves of the main and auxiliary feed rollers being cut away in order to show the main and auxiliary cutter rollers as well as the ducts for discharging chopped strands being cut away.

Referring to FIG. 1, a plurality of spinning furnaces preferably comprise four juxtaposed furnaces each designated by numeral 11. Each furnace 11 produces molten glass therein from raw material or marbles which is fed from a marble feeder 12. The bottom of each furnace 11 is formed with 400 to 2,000 orifices 13 through which separate streams of molten glass are extruded to provide 400 to 2,000 fine glass filaments, which are then applied with a lubricant type sizing agent by a sizer 15 and thereafter collected into a strand 17 by a collecting roller 16. Four strands 17 thus formed are led through respective idle rollers 18 to a main guide roller 19. The main guide roller 19 are formed with four circumferential grooves 20 by which the strands 17 are guided respectively in the manner as shown in FIGS. 2 and 3. The strands 17 are then taken up by a main feed roller 21 in parallel spaced relationship with each other. After contacting the circumferential surface of the main feed roller 21 through a predetermined angle, the strands 17 are cut or chopped by a main cutter roller 22 into chopped strands 23 of a predetermined length. The chopped strands 23 are carried out by a conveyor 24 as a commercial product.

As described in Japanese Patent Publication No. 50-27089, the attenuation of the glass filaments 17 is performed only by the main feed roller by which the strands are taken up so that the strands are drawn by frictional force due to contact with the circumferential surface of the main feed roller 21 through the predetermined angle.

As shown in FIG. 3, the circumferential surface of the main feed roller 21 is lined with a material 25 of high coefficient of friction with respect to glass fibers such as a polyurethane rubber. The main feed roller 21 is rotatably supported through bearings 29 on a hollow shaft 28 which is secured to and designed to protrude from a feed roller housing 27 mounted on a frame 26 (See FIGS. 1 and 2).

The main cutter roller 22 arranged to face the main feed roller 21 is secured by a nut 34 to a rotary shaft 33 which is journaled by bearings within a cutter housing 31. The main cutter roller 22 has a plurality of blades 35 on the outer circumference thereof. The blades 35 are inclined by 5 to 25 degree relative to a rotational axis of the cutter roller 22 with substantially equidistant spaces from each other. The cutter housing 31 is slidably supported on two stationary shafts 37 held by two pairs of brackets 36 secured to the frame 26, so that the cutter housing may be movable in a direction perpendicular to the axis of the main cutter roller 22. A hydraulic cylinder 39 is mounted on a bracket 38 secured to the frame 26 to drive the cutter housing for movement along the shafts 37, thereby permitting the main cutter roller 22 to be forced against and contact the main feed roller 21 under a desired pressure. This construction also ensures that various diameters of main feed rollers can be used and that wear of the main feed roller can be compensated. The lining 25 of the main feed roller 21 may be removed for dressing or replacement if it is worn out to its working limit. The main feed roller 21 has a pulley 40 mounted on one end thereof so as to be driven through a belt 42 by a motor 41 mounted on the frame 26. The motor 41 is preferably an eddy current coupling type motor which can control its rotation speed and starting time, so that the circumferential speed of the main feed roller 21 can be maintained substantially constant even if the diameter of the roller is decreased due to wear of the lining 25.

The essential feature of the present invention resides in provision of an auxiliary feed roller 43 and an auxiliary cutter roller 44 in addition to the above mentioned construction. The auxiliary feed roller 43 has a circumferential surface lined with a material 45 of high coefficient of friction with respect to glass fibers similar to the lining 25 of the main feed roller 21, and is secured by a nut 48 to a front end portion of the shaft 47 journaled by the bearings 46 within the hollow shaft 28 which is secured to the feed roller housing 27. Secured to a rear end portion of the shaft 47 is a pulley which is driven through a belt 51 by another motor 50 mounted on the frame 26. The motor 50 is preferably also an eddy current coupling type motor which can control its rotation speed and starting time. Thus, the auxiliary feed roller 43 is arranged adjacent to and in axial alignment with the main feed roller 21 so that the roller 43 may be driven independently of the roller 21.

The auxiliary cutter roller 44 has cutter blades 52 of the construction similar to the main cutter roller 22 and is rotatably supported through bearings 53 on a stationary shaft 54. The shaft 54 is mounted at its opposed ends on a forked bracket 56 which is connected to an end of a rod of another hydraulic cylinder 55, which is mounted on the bracket 38 on the opposite side from the cylinder 39. Thus, the auxiliary cutter roller 44 can moved toward and away from the auxiliary feed roller when the cylinder 55 is actuated.

An auxiliary guide roller 57 is disposed laterally of the auxiliary feed roller 43. The auxiliary guide roller 57 is made of a material of low coefficient of friction with respect to glass fibers such as fluoroplastics. The auxiliary guide roller 57 is rotatably supported on a front end portion of a rod 59 of a hydraulic cylinder 58 mounted on the frame 26 so that the roller 57 may be moved parallel with the main and auxiliary feed rollers 21, 43 and retracted to a position adjacent to a rear end portion of the main feed roller 21. The auxiliary guide roller 57 is formed with a circumferential groove 60 for guiding a strand of glass filaments. The groove 60 is defined by opposed circumferential edges of the roller 57 with the front circumferential edge smaller in diameter than the rear circumferential edge for allowing a strand arrested by the groove 60 to be easily removed forwardly in the manner described hereinafter.

As apparent from the foregoing, the main guide roller 19 is disposed laterally of the main feed roller 21 and formed with four circumferential grooves 20 equal in number to the strands to be chopped. The main guide roller 19 is rotatably supported on a front end portion of a shaft 61. A means 62 for releasing a strand arrested by the groove 60 of the auxiliary guide roller and positioning the strand in the corresponding groove 20 of the main guide roller 19 is disposed in juxtaposed relationship with the main guide roller 19 and is connected to the shaft 61 through a bracket 63. The strand positioning means 62 is provided with positioning pins 64 equal in number to the grooves 20 of the main guide roller 19 and electromagnetic coils (not shown) therein for actuation of the pins 64 so that each pin 64 can be protruded to a position just behind the corresponding strand (on the left side of the strand as seen in FIG. 3) guided by the groove 20 of the main guide roller 19 when the corresponding electromagnetic coil is energized. Although the main guide roller 19 and the positioning means 62 are ordinarily held at a predetermined position relative to the main feed roller 21, it is preferable that they are adapted for unitary movement parallel to the main feed roller 21 to permit their positions to be varied as needed. To this end, the shaft 61 which supports the main guide roller 19 and the strand positioning means 62 is slidably supported by a pair of bearings 66 mounted on a housing 65 attached to the frame 26. A shaft 67 is journaled by a pair of bearings 68 within the housing 65 above the shaft 61. The shaft 67 is externally threaded to provide a feed screw with a pitch of about 1.25 mm. A motor 69 and a reduction gear 70 are mounted on the housing 65 such that rotation from the motor 69 is reduced by the reduction gear 70 and then transmitted to the shaft 67 through gears 71, 72. The shaft 67 has a slider 73 screwed thereon on and connected to a clamp 74 which carries the shaft 61. Thus, upon rotation of the motor 69, the slider 73 is caused to move forwardly or backwardly along the rotary shaft 67 depending upon the direction of rotation of the motor 69, so that the shaft 61 is moved forwardly or backwardly so as to vary the positions of the main guide roller 19 and the strand positioning means 62.

Additionally, limit switches 75 are provided for limiting the stroke of the main guide roller 19 and the strand positioning means 62 to prevent excess movement thereof over the length of the main feed roller 21. That is, the motor 69 is stopped when the clamp 74 is made into contact with the limit switches 75.

In operation, as above described, glass filaments which are extruded through the orifices 13 of each of the spinning furnace 11 and applied with a sizing agent by the sizer 15 are collected by the corresponding correcting roller 16 into a strand 17. The strands 17 are then led through the idle roller 18 and the main guide roller 19 to the main feed roller 21 so that they are taken up in parallel with each other by the main feed roller 21. The strands 17 taken up by the main feed roller 21 are cut or chopped into chopped strands 23 by the main cutter roller 22.

In case of breakage of one of the strands 17, the auxiliary feed roller 43 is operated to rotate at a relatively low speed while the cylinder 55 is actuated to move the auxiliary cutter roller 44 toward the auxiliary feed roller 43 so that the auxiliary cutter roller 44 is brought into contact with the auxiliary feed roller 43 to be rotated therewith. The end portion of the broken strand 17' in non-attenuation due to no drawing force by the main feed roller 21 is passed over the idle roller 18 and the auxiliary guide roller 56 and led to the auxiliary feed roller 43 so that the strand 17' is taken up by the roller 43 in a direction as indicated by a in FIG. 3. The broken strand 17' taken up by the auxiliary feed roller 43 in the direction a is subjected to tension as the auxiliary feed roller 43 continues to rotate so that the strand 17' is automatically displaced into directions as indicated by b and and c in FIG. 3. It should be noted that since the auxiliary feed roller 43 is rotated at a low speed, the taking-up operation will be made with safe and the sudden application of a large tension to the strand 17' which would cause re-breakage of the strand can be avoided.

After the strand 17' has been completely taken up by the auxiliary feed roller 43, the rotation speed of the roller 43 is gradually increased until the drawing force imparted to the strand 17' causes normal attenuation of the strand 17'. During this operation, the strand 17' taken up by the auxiliary feed roller 43 is continuously cut or chopped off by the auxiliary cutter roller. It should be noted, therefore, that the above mentioned problems which would occur if the rotation speed of the feed roller is increased without chopping off of the strand 17' will be overcome. The chopped strands produced by the auxiliary cutter roller 44 are discharged into an underground pit 77 through a duct 76 separately from normal chopped strands carried out by the conveyor 24.

When the rotation speed of the auxiliary feed roller 43 reaches a normal attenuation speed, the cylinder 58 is actuated to retract the auxiliary guide roller 57 so that the strand 17' may be moved from a first position laterally adjacent to the auxiliary feed roller 43 to a second position laterally adjacent to the main feed roller 21. When the strand 17' reaches the second position and is aligned with its corresponding groove 20 of the main guide roller 19, the strand 17' is brought to engage the pin 64 for the corresponding groove as the pin 64 already has been protruded by energization of the corresponding electromagnetic coil. When the auxiliary guide roller 57 is further retracted, the strand 17' which is now prevented from moving by the pin 64 is removed or released from the auxiliary guide roller 57 and is introduced onto the corresponding guide groove 20 of the main guide roller 19 by its own tension so that the strand may be prepared for cutting into normal chopped strands 23. It should be noted that the removal of the strand 17' from the auxiliary guide roller 57 is made without any difficulty as the strand being removed from the roller rides over the front circumferential edge of a smaller diameter as above described.

When the strand 17' has been introduced onto the corresponding groove 20 of the main guide roller 19, the corresponding electromagnetic coil is de-energized so that the positioning pin 64 is retracted to its original position, the auxiliary cutter roller 44 is moved away from the auxiliary feed roller 43, the rotation of the roller 43 is stopped, and the auxiliary guide roller 57 is returned to its initial position and is prepared for the next operation.

The signal for energizing the electromagnetic coil for extruding the positioning pin 64 is supplied from the corresponding spinning furnace 11 whose strand 17 has been broken.

It should be noted that during the introduction of the broken strand 17', the normal or unbroken strands 17 are continued to be taken up by the main feed roller 21 and cut by the main cutter roller 22 so that the reduction in production of chopped strands 23 is very little.

Although the mode of operation has been described in conjunction with the introduction of a broken strand, it will will be apparent that the invention is equally applicable to introduction of strands in initiation of the operation of the chopped strand manufacturing system. In this case, the signals are successively supplied from the spinning furnaces 11 so that the electromagnetic coils are successively energized to protrude the positioning pins 64 in order one by one for engagement with the strands 17 in the manner above described. That is, the above mentioned operation is repeated for each strand. An automatic control system may be applied to such repeated operations and the following moving of the auxiliary cutter roller 44 away from the auxiliary feed roller 43 and stopping of the rotation of the roller 43.

It should be noted that the application of the invention to the introduction of strands in initiation of the operation of the system is advantageous in that cutting of the strands 17 taken up by the main feed roller 21 are initiated in order without awaiting completion of introduction of the last strand.

Additionally, the present invention is advantageous in that the overall effective lengths of the main feed and cutter rollers 21, 22 can be fully used as the main guide roller 19 and the positioning means 62 are movable parallel with the main feed roller 21. In this connection, if the strands 17 taken up by the main feed roller 21 always possess the same positions, the lining 25 of the main feed roller 21 and the blades 35 of the main cutter roller 22 are worn out at the corresponding portions. This causes incomplete cutting of strands and rupturing of the same with production of fluffs as well as reduction of the drawing force due to occurrence of the sliding contact of the strands with the lining 25, thereby preventing normal attenuation of the strands. The strands each consist of 800 glass filaments each having 13 microns diameter are cut off while travelling at a rate of approximately 1,200 meters per minute. The presence of fluffs in the strands occurs three or four hours after starting of the operation of the apparatus. In view of this fact, it is desirable to drive the motor 69 at suitable time intervals to move the main guide roller 19 and the strand positioning means 62 so that the portions of the main feed roller 22 where the strands contact therewith are shifted three to five millimeters axially of the feed roller. This is repeated so that the strands 17 may be moved over the whole effective length of the main feed roller 21. An automatic control system may be employed for such operation by previously determining time and distance intervals of movement of the strands.

Furthermore, the continuous driving of the main feed roller during the operation of the system is contributable not only to increase of the production of chopped strands, but also to avoiding the necessity of a high starting torque for the main motor as well as minimizing the torque variation in operation, thereby reducing wear of the feed roller surface and cutter blades and ensuring a considerably long stable operation of the system.

Although the present invention has been described in relation of cutting or chopping off four strands 17, it is to be understand that the invention is not limited to the number of strands and may be equally applied to any case where more than two strands are to be cut.

Various modifications in structure and/or function may be made by one skilled in the art to the disclosed embodiment of the invention without departing from the scope of the invention as defined by the claims.

What is claimed is:

1. A method of introducing a strand of glass filaments onto a feed roller or a system for manufacturing chopped strands of glass filaments wherein a multiplicity of glass filaments extruded through orifices in the bottoms of at least two spinning furnaces and applied with a sizing agent are collected to form at least two strands of glass filaments, which are thereafter brought into contact with the circumferential surface of the feed roller through a predetermined angle so as to be drawn and attenuated by frictional force exerted by the contact with the circumferential surface of the feed roller while the strands of glass filaments are cut into chopped strands of a predetermined length with a cutter roller in contact with the circumferential surface of the feed roller, comprising: providing an auxiliary feed roller disposed adjacent one end of said main feed roller in axial alignment therewith and adapted to be driven independently of said main feed roller; providing an auxiliary cutter roller adapted to contact under pressure the circumferential surface of said auxiliary feed roller to rotate therewith; maintaining stationary or driving said auxiliary feed roller at a relatively low rotation speed while rotation of said main feed roller is maintained at a normal attenuation speed; causing said auxiliary feed roller to take up a strand of glass filaments to be introduced onto said main feed roller; gradually increasing the rotation speed of said auxiliary feed roller to a normal attenuation speed; and moving the strand wrapped around said auxiliary feed roller onto said main feed roller.

2. In a system for manufacturing chopped strands of glass filaments wherein the system comprises at least two spinning furnaces having orifices in each bottom thereof for extruding separate streams of molten glass to provide a multiplicity of glass filaments, means for applying a sizing agent to said glass filaments, means for collecting said glass filaments to form at least two strands of glass filaments, a guide roller having at least two circumferential grooves for guiding said strands in parallel with each other, a feed roller having a circumferential surface for drawing the attenuating said strands from said guide roller by frictional force when the strands are brought into contact with the circumferential surface through a predetermined angle, and a cutter roller adapted to contact the peripheral surface of said feed roller for cutting said strands into chopped strands of a predetermined length, an apparatus for introducing a strand of glass filaments onto said feed roller comprising: an auxiliary feed roller disposed adjacent one end of said main feed roller in axial alignment therewith; means for driving said auxiliary feed roller at a variable speed independently of said main feed roller; an auxiliary cutter roller adapted to contact under pressure the circumferential surface of said auxiliary feed roller to rotate therewith; an auxiliary guide roller for guiding a strand of glass filaments to introduce the strand onto the circumferential surface of said main feed roller; means for moving said auxiliary guide roller parallel with the axis of said main and auxiliary feed rollers from a first position laterally adjacent to said auxiliary feed roller to a second position laterally adjacent to said main feed roller; and means for releasing the strand guided by said auxiliary guide roller therefrom and positioning the release strand in the corresponding circumferential guide groove of said main guide roller when the auxiliary guide roller is moved from said first position to said second position.

3. The apparatus as set forth in claim 2 wherein said strand positioning means includes a plurality of positioning pins equal in number to said circumferential guide grooves of said main guide roller and located in on-to-one corresponding relationship with said circumferential guide grooves; and means for selectively actuating said positioning pins to cause extrusion one of the pins corresponding to the circumferential guide groove onto which the strand guided by said auxiliary guide roller is desired to be introduced whereby, when said auxiliary guide roller is moved from said first position to said second position, the strand guided by and moved with said auxiliary guide roller is brought into engagement with the extruded positioning pin and prevented from movement thereby to be released from said auxiliary guide roller and introduced onto the corresponding guide groove of said main guide roller.

4. The apparatus as set forth in claim 2 or 3 further comprising means for moving said main guide roller and strand positioning means in unison with each other in parallel with the axis of said main feed roller between the opposed ends thereof.

* * * * *

UNITED STATES PATENT AND TRADEMARK OFFICE
CERTIFICATE OF CORRECTION

PATENT NO. : 4,175,939
DATED : November 27, 1979
INVENTOR(S) : Koji Nakazawa et al.

It is certified that error appears in the above–identified patent and that said Letters Patent are hereby corrected as shown below:

Column 8, line 45, for "or" read --of--.

Column 9, line 16, for "the" read --and--.

Column 10, line 14, for "on-to-one" read --one-to-one--.

Signed and Sealed this

Seventeenth Day of June 1980

[SEAL]

Attest:

SIDNEY A. DIAMOND

Attesting Officer

Commissioner of Patents and Trademarks